United States Patent [19]

Landstrom et al.

[11] Patent Number: 4,470,405

[45] Date of Patent: Sep. 11, 1984

[54] METHOD AND APPARATUS FOR CONTROLLING INSOLATION IN A BUILDING

[75] Inventors: D. Karl Landstrom; Sherwood G. Talbert, both of Columbus; William H. Wilkinson, Upper Arlington; George H. Stickford, Jr.; Frank E. Jakob, both of Columbus, all of Ohio

[73] Assignee: Battelle Memorial Institute, Columbus, Ohio

[21] Appl. No.: 334,773

[22] Filed: Dec. 28, 1981

[51] Int. Cl.³ .............................................. F24J 3/02
[52] U.S. Cl. .................................... 126/428; 126/445; 126/419; 126/432; 52/306; 350/258; 350/267; 47/17
[58] Field of Search ............... 126/444, 432, 428, 429, 126/419, 450, 452, 445; 47/17; 350/258, 267; 52/171, 743, 616, 618, 306

[56] References Cited

U.S. PATENT DOCUMENTS

| | | | |
|---|---|---|---|
| 2,439,553 | 4/1948 | Winn | 126/900 X |
| 3,107,052 | 10/1963 | Garrison | 126/428 X |
| 3,475,868 | 11/1969 | Johnson | 47/17 X |
| 4,108,373 | 8/1978 | Chiapale et al. | 126/428 X |
| 4,111,186 | 9/1978 | Ross et al. | 126/426 |
| 4,127,102 | 11/1978 | Berman | 126/444 |
| 4,147,002 | 4/1979 | Kautz | 47/17 X |
| 4,210,128 | 7/1980 | Mattson | 126/444 |
| 4,278,075 | 7/1981 | Heierli | 126/445 |
| 4,338,919 | 7/1982 | Hwang | 126/900 X |

FOREIGN PATENT DOCUMENTS 22389 1/1981 European Pat. Off. ............... 47/17

Primary Examiner—Larry Jones
Attorney, Agent, or Firm—Robert B. Watkins

[57] ABSTRACT

A method, apparatus and system is provided for controlling the rate of insolation transmission through the roof of a building, such as a greenhouse. The roof is provided with translucent panels through which liquid containing opaquing material passes. Control is effected by varying the amount of opaquing material passing through the panels, according to preselected optimum fulfillment of the combined heating, cooling and insolation needs of the building under varying atmospheric conditions.

5 Claims, 6 Drawing Figures

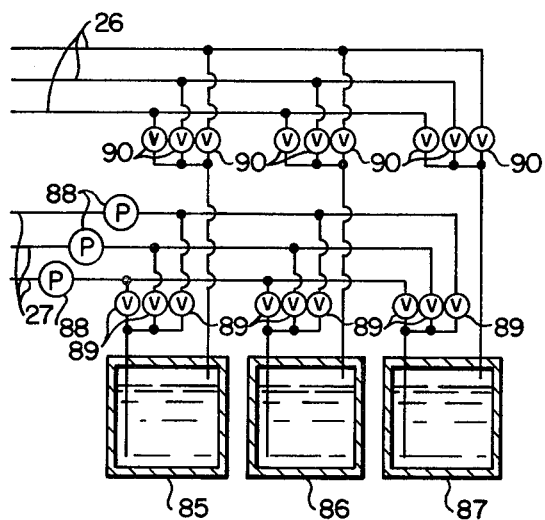
FIG. 6
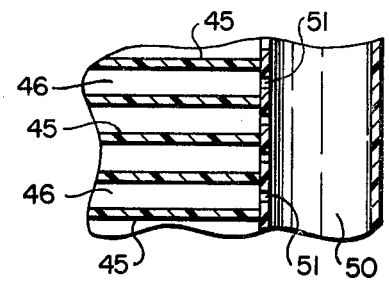
FIG. 4
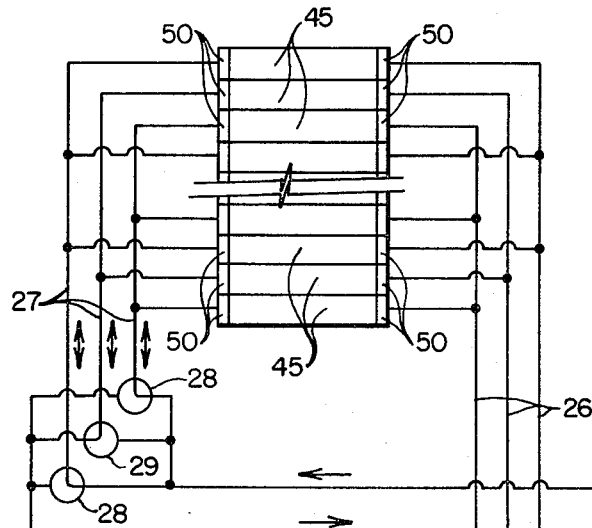
FIG. 5
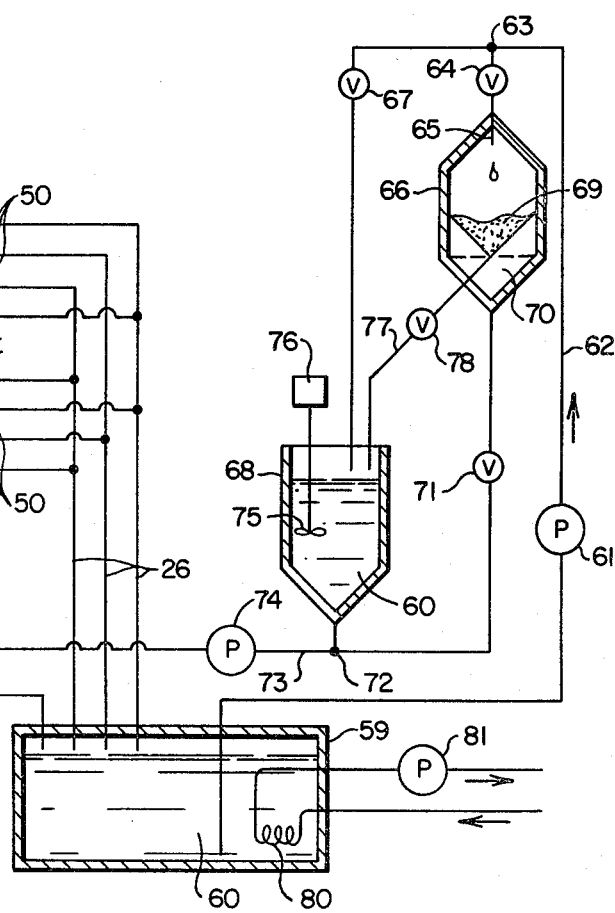

METHOD AND APPARATUS FOR CONTROLLING INSOLATION IN A BUILDING

SUMMARY OF THE INVENTION

This invention relates to a method and apparatus for controlling the amount of insolation entering a building. More particularly it relates to a method and apparatus in which the amount of solar radiation passing through the roof of a building is controlled by varying the amount of opaquing material present in a plurality of panels in the roof of the building.

In summary, the method of this invention includes; (a) conveying a liquid containing an opaquing material through a plurality of translucent conduits in the roof of a building, (b) controlling the rate of insolation passage through the conduits and the heat absorption of the liquid by varying the number and combinations of conduits conveying the liquid through the roof, and (c) simultaneously or alternatively varying the amount of opaquing material in the liquid being conveyed through the conduit.

The apparatus of this invention comprises: a roof structure including frame assemblies of translucent insolation passing material, constructed into separate panels with contiguous integrally formed first conduits in liquid fluid communication with common header second conduits at opposite ends; including a source of a liquid containing opaquing material selected to enhance the insolation blocking opacity properties of the liquid; further including means constituting a system for connecting and conveying the liquid from the source through the second and first conduits; and means for controlling the rate of insolation transmitted through the panel by varying the amount of opaquing material passing through the panels according to a preselected optimum fulfillment of the combined heating, cooling and insolation needs of the building.

Greenhouses are a kind of building which require that significant amounts of solar radiation; i.e. insolation, be admitted to the inside. Traditionally, greenhouses have been constructed with roofs that are either made of transparent/translucent material, or roofs that are adapted to be removed in one way or another such as sliding panels, furling canvas, etc.

The growing plants in greenhouses require different amounts of insolation and different cycles depending on their variety and their period in the growing cycle. Since greenhouses and other buildings are located in various climates, the amount and intensity of available insolation is different depending on the locality.

For the above reasons, it is important that a simple and efficient method and apparatus be provided to vary and control the amount of insolation that reaches the inside of the building.

In recent years, increasing costs of energy has focused important attention on the use of solar energy as a source. Solar radiation is most frequently used in the form of heat from the sun's rays which are absorbed in other materials subjected to the solar radiation. A common approach is the use of solar panels in which the rays of the sun are absorbed and conducted to a liquid circulating in conduits on the roof of buildings and other open spaces.

Such solar panels have been constructed in a variety of ways and a typical example is that shown in U.S. Pat. No. 4,205,662—Rhodes et al, which is directed primarily to the collection of heat in a fluid passing through a plurality of laterally spaced longitudinal passageways. The main body of passageways is disposed between an upper glazing member and a lower support member.

Combining solar heating apparatus with insolation controlling apparatus, has not received as much attention in the prior art as has been given separately to these concepts.

U.S. Pat. No. 4,108,373—Chiapale et al, discloses a greenhouse wherein a liquid is passed through the roof and walls. The liquid has infrared filtering characteristics such as provided by a copper chloride in water solution. The solution is passed through the walls as a heat absorbing medium.

Attention is given to restricting light transmission into greenhouses; i.e. shading, in U.S. Pat. No. 4,147,002—Kaatz, in which a dry particulate material is blown into roof and wall cavities when shading is desired, and drawn out of the cavities when unrestricted light transmission is desired. The process of the patent is to blow the particulate material into place and then to subsequently reverse the process later and withdraw the material.

It is known that there are a large variety of atmospheric or weather conditions which occur as frequently as every day, and as infrequently as once a season, that influence the insolation and heating conditions to which a greenhouse is subjected. In certain parts of the world, high temperatures and insolation is encountered in the daytime while low temperatures are prevalent at night. In such circumstances, various degrees of shading are required in the daytime and heat is required to be added at night. In some circumstances, cooling is required when the amount of insolation requires that shading be added.

In addition to these requirements for the optimum growing cycle of plant life in the greenhouse, it is desirable that maximum energy efficiency be obtained in heating and cooling the greenhouse. Therefore, an additional parameter that should be controlled is the amount of heat absorption obtainable from the solar radiation that is available.

In order to meet the varying requirements for insolation and heat absorption, this invention provides a means of varying the amount of opaqueness or opacity in a plurality of roof panels of a building. The opacity may be varied and controlled in either of one or two ways, or by a combination of the two.

The term opacity, as used herein, means the capacity of a material to block and absorb or reflect light. The terms translucent and transparent relate to the capacity of a material to transmit light. Transparency is a higher degree of translucence whereby the light is transmitted with less diffusion so that matters of form are more apparent when viewed from the opposite side.

Recent advances in the art of solar heat absorption techniques have brought about a variety of "black liquid" materials that are especially compounded or formulated to enhance various properties desired in solar heat absorption usage. Frequently used black liquids are now compounded with carbon black particles in submicron sizes in which the particles remain in colloidal suspension for extended periods of time with little or no agitation. A black liquid, suitable for use in this invention, can be compounded to one hundred percent opacity in a thickness of one centimeter. The degree of opacity can be varied by dilution and reducing the ratio of carbon black particles in the liquid.

The liquid used in black liquids is usually water, but may be other materials such as glycols or oils.

It is an object of this invention to provide a means of controlling the amount of insolation passing through the roof of a greenhouse or other building by varying the opacity of roof panels having a black liquid flowing through conduits in the roof panels of the building. It is a further object to vary the opacity of the panels by either varying the number and combination of panels containing the opaque liquid so that the total opacity is controlled, or to vary the amount of opaquing material in the liquid, to control the amount of insolation and heat absorption according to a preselected optimum fulfillment of the building needs. It is a further object of the invention to effect the desired controls by a combination of the above recited methods under some circumstances.

Other objects and features of the invention will be apparent and understood from the detailed description of the invention and the accompanying drawings which follow.

DESCRIPTION OF THE DRAWINGS

FIG. 4 is a cross-sectional view of a portion of the roof structure, taken along the line 4—4 of FIG. 3.

FIG. 5 is a schematic view of the system of this invention.

FIG. 6 is a schematic view of another embodiment of the system.

DETAILED DESCRIPTION OF THE INVENTION

Figure 1:
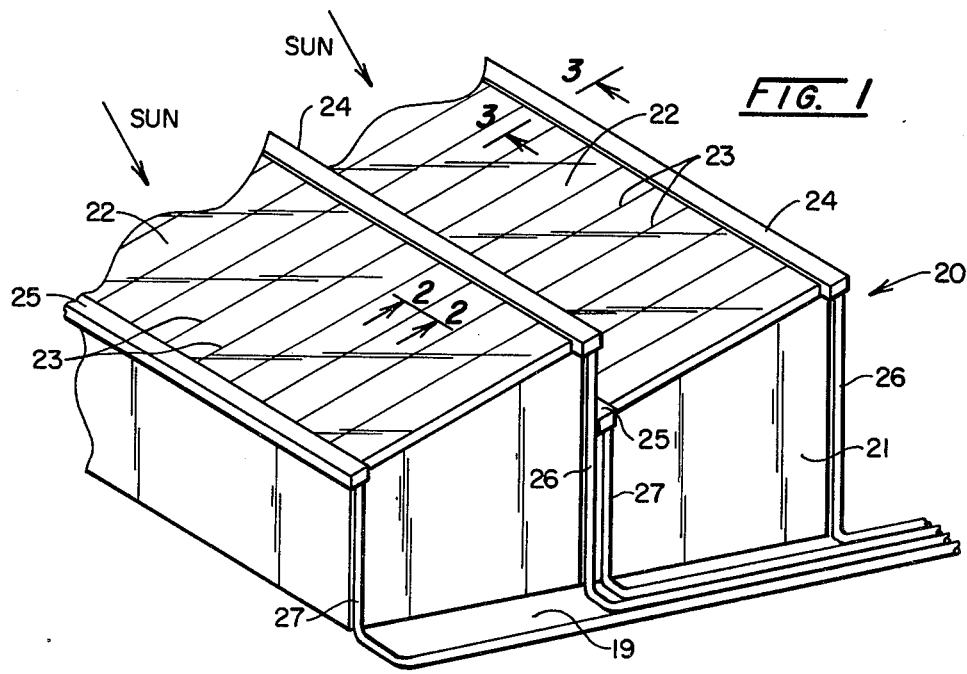
FIG. 1 is a perspective view of a typical building having the apparatus of this invention and suitable for employing the method of this invention.

Referring to FIG. 1, building 20 is shown as employing a generally sawtooth roof line construction having walls 21 and a roof structure 22. A conventional gable roof construction could also be used. The roof is made up of elongated frame assemblies 23 generally longitudinally oriented from a peak 24 to the eaves or valleys 25. The building rests on the ground 19.

The building is generally oriented so that the rays of the sun strike the frame assemblies 23 at an optimum angle, typically as near to 90 degrees at noon as possible for the locality at the time of year of the maximum heating or cooling load.

Piping 26, connecting to the peaks 24, is provided from the ground 19, for purposes to be described later in further detail herein. In the like manner, piping 27 is connected to the eaves 25.

Figure 2:
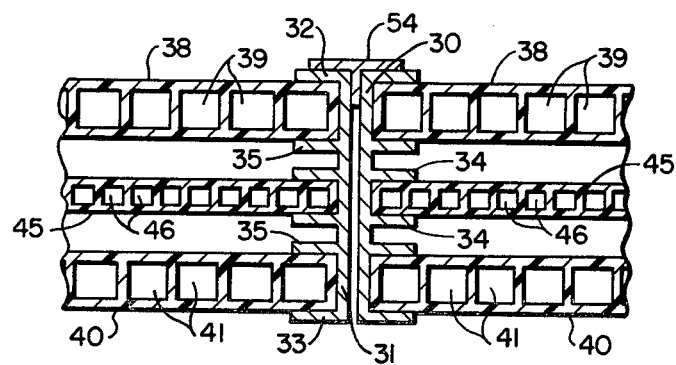
FIG. 2 is a cross-sectional view of a portion of the roof structure of the building, taken along the line 2—2 of FIG. 1.
Figure 3:
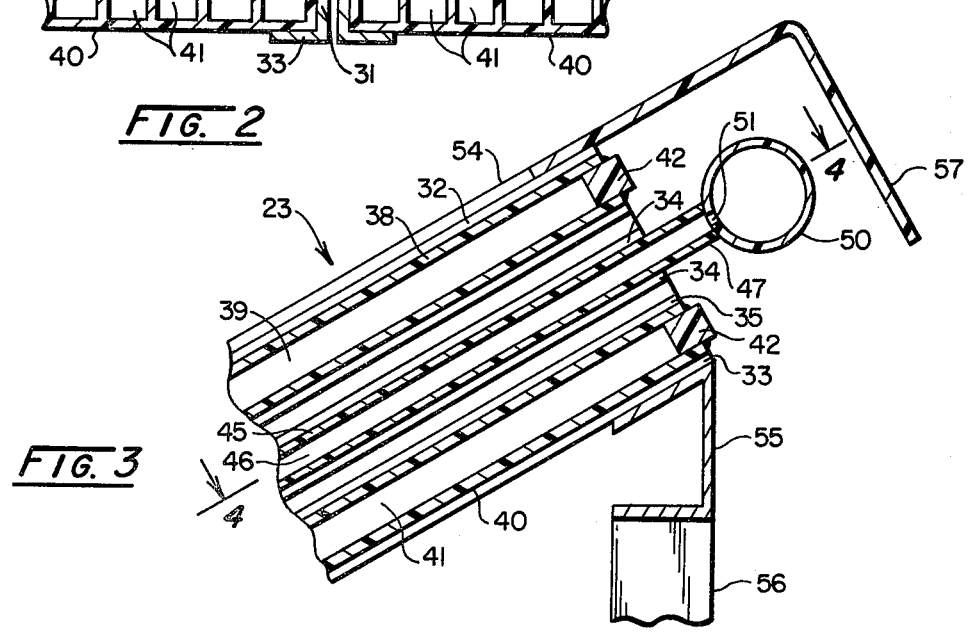
FIG. 3 is a cross-sectional view of a portion of the roof structure taken along the line 3—3 of FIG. 1

Referring to FIGS. 2, 3 and 4, the roof frame assemblies 23 comprise channel formed side members 30 having a web 31, outstanding top flanges 32, bottom flanges 33 and central track flanges 34 and 35, respectively. An external generally flat cover 38 is constructed to fit longitudinally the length of the frame assembly 23 and between the exterior flange 32 and the track flange 35. Cover 38 is constructed as an extrusion of a translucent/transparent plastic material and is provided with longitudinal passageways 39 extending the length of the cover from the ridge 24 end to the eaves 25 end. The material from which the cover 38 is formed may be any generally weather resistant material which provides a high degree of transmission for solar radiation, particularly in the visable wave length range. A similar lower cover 40 is fitted between the flanges 33 and 35. It is provided with passageways 41 extending the length of the cover 40.

In the construction of the frame assemblies 23, the roof covering members 38 and 40 are spaced apart from the panel 45 leaving a still-air space on either side. The still-air space provides a further insulation barrier against the passage of heat in and out of the building without interferring with the insolation passing capabilities of the roof 22.

Although the construction shown in FIG. 2 is a preferred embodiment, alternative frame assemblies 23 may omit either external cover 38 or lower cover 40 or both. The omission of covers has the effect of reducing the insulating qualities of the frame assemblies, but in some situations, this may be satisfactory or desirable.

The rays of the sun in the ultraviolet spectrum (UV) are detrimental to many of the translucent materials that are used in the construction of solar panels so that some means of protection may be used. This is accomplished by adhering a UV filtering film to the outside of the panel 45, or cover 38. It may also be accomplished by including UV filtering compounds in the formulation of the plastic materials from which the members are made.

As seen in FIG. 3, the passageways 39 and 41 are closed at their upper ends, by sealing means 42. At the opposite end (not shown), the passageways remain open to the atmosphere, providing insulating still-air spaces that reduce the overall heat transmission of the covers 38 and 40, as well as the frame assembly 23 as a whole.

A panel 45 is centrally positioned between the covers 38 and 40, extending from one channel 30 to the other, supported in the flanges 34. The panel 45 is constructed with integrally formed contiguous longitudinal conduits 46 (the first conduits), which extend the entire length of the panel 45 from the ridge end 24 to the eaves end 25.

The panel 45 projects beyond the end of the frame assembly 23 in an extended portion 47, where it is joined to a common header 50 (the second conduit). The conduits 46 are in liquid fluid communication with the second conduits 50 through an orifice 51.

At the opposite end of the frame assembly 23, the panel 45 extends and is fitted with a header 50 in the same fashion as that shown in FIG. 3.

The panels 45 may vary in width, either containing only a few conduits and being relatively narrow, or containing a large number of conduits and being much wider. In a preferred embodiment, by way of example, a panel was constructed approximately 60 centimeters wide and have conduits across the width. The panels are constructed of molded or extruded polysulfone plastic material, a specially compounded polymer. Other plastic materials can be used.

Each panel 45 is provided with an individual header 50, extending the width of the panel.

As seen in FIG. 1, frame assemblies 23 are in adjacent side-by-side position, and may be sealed on the outside with a rubber-like T-shaped sealing element 54 or other means. The frame members 23 may be supported on a common channel beam 55 which is carried by a column 56. A suitable ridge cover 57 is formed over the header 50 and joined to the upper corner of the frame members 23, as shown in FIG. 3.

Referring to FIG. 4, the second conduits 50 are connected to the first conduits 46 through flow control orifices 51 which provide a reasonably uniform flow distribution across the panel 45.

Referring to FIG. 5, in the complete system shown schematically, the second conduits 50 are connected to the panels 45.

Each header 50 on the lower end of the panel 45 is connected through piping 27 to a valve means 28, 29, and to a reservoir 59 containing a "black" liquid 60. A pump 61 is connected through piping 62 to a junction 63. The junction 63 is connected on one side through a valve 64 to an inlet 65 of a filter tank 66. The other side of the junction is connected through a valve 67 to an inlet in a mixing tank 68 which contains a further source of black liquid 60. A mixer 75 may be suspended in the mixing tank 60 operated by an electric motor 76.

In the filter 66, opaquing material 69 is filtered from the black liquid, leaving a relatively clear liquid 70 in the lower portion of the filter tank 66. The stored clear liquid 70 is connected through a valve 71 to a junction 72 at the outlet of the mixing tank 68. Piping 73 connects with a pumping means 74 that is connected with the valve means 28, 29.

A heat exchanger 80 is submerged in the black liquid 60 in the reservoir 59. The heat exchanger is connected to another working fluid which is moved by means of pump 81, to an apparatus for useful work such as heating or cooling the building.

In operation of the apparatus and the system, the black liquid; i.e. a liquid containing an opaquing material, is conveyed by the pump 61 through piping 62, where it is proportionally directed as necessary and under control of valves 64 and 67 to either the filter tank 66 or the mixing tank 60. That portion which is directed to the filter tank 66, is filtered, and the clear liquid 70 is conveyed to the junction 72.

That portion, which is directed to the mixing tank, is blended with opaquing material from the filter 69 through piping 77 under the control of valve 78 to the mixing tank 60.

Clear liquid 70 is blended with the mixture from the mixing tank 60 at the junction 72, and is conveyed by the pump 74 through the valves 28, 29 and piping 27, to the inlet headers 50 wheree it is distributed to the panels 45 under control of the valve means 28, 29.

Valve means 28, 29, are bi-directional and may be turned to direct liquid from the pump 74 into the headers 50 and panels 45, as valves 28 are shown, or may be turned to allow the panels 45 and headers 50 to drain back to the reservoir 59, as valve 29 is shown.

Referring to FIG. 6, in another embodiment of apparatus to carry out the method of the invention, a plurality of reservoirs 85, 86 and 87 may be employed. Each reservoir contains a liquid of a different dilution of materials. A system of pumps 88 and valves 89 are connected to the inlet piping 27. A plurality of valves 90 are connected to the outlet piping 26. When a liquid of a certain dilution is needed, liquid is selectively pumped from the appropriate reservoir through the system. This is accomplished by operating the appropriately matched pumps 88 and valves 89, 90, that are associated with the appropriate headers 50, panels 45 and reservoirs 85, 86, 87. In this embodiment of operation, the variety of control parameters is limited by the number of reservoirs.

The objectives of the invention are met by operation of the system, and controlling the flow of the liquid through the various component apparatus of the system to control the rate of insolation transmission through the panels 45 and into the building interior.

For instance, when there is a maximum need for shading the building interior because conditions in the greenhouse will permit or require at or near total darkness in the greenhouse, opaquing material from the filter 69 is conveyed under control of the valve 76 to the mixing tank 60 where it is blended into the liquid by the mixer 75 with the valve 71 closed. The pump 74 conveys black liquid in its most opaque condition through the piping 27 to the header 50 and through all of the panels 45 simultaneously, with all of the valve means 28, 29 in the open-to-pump position. Continuous operation in this condition causes the black liquid 60 to completely shut out all sunlight from passing through the panel 45 while simultaneously allowing the liquid to absorb heat at its maximum rate and convey that heat to the reservoir and source 59 for use through the heat exchanger 80.

In the event that plant life in the greenhouse requires the admission of some insolation and the other conditions previously stated remain, the amount of opaquing material passing through the panels may be reduced to provide less shading and some solar radiation directly through the roof to the plants beneath. This is accomplished by turning valve means 28, 29 in selective combinations. For instance as shown in FIG. 5, alternate valve means 28, 29, are turned. Valve means 29 is turned to allow all liquid to drain from the panels to which it is connected, and allow the sunlight to pass through those panels. Accordingly, in the operating mode shown in FIG. 5, direct sunlight is admitted through every other panel 45.

Of course, other combinations may be selected to admit more or less direct sunlight.

In other circumstances, such as when the sun is directly overhead and of maximum intensity as in the summertime, it may be desirable to control the rate of insolation transmission through the panels 45, by varying the amount of opaquing material in the panel, by selectively removing a portion of the opaquing material from the liquid. This is accomplished through diluting the liquid from the mixing tank 60 by the admission of clear liquid 70 at the junction 72, when liquid is being conveyed to the header 50 by the pump 74 and piping 26. When the liquid is diluted, the solar radiation is filtered in certain wave lengths, depending on the kind of liquid and the kind of opaquing material being used. The use of diluted liquid, i.e. shading, in this way is useful in providing the right condition for plant growth in the greenhouse.

Depending on plant growing conditions, atmospheric conditions, the amount of solar radiation available, the amount of heating or cooling load or other useful work requirements, the control may selectively be either the number and combination of panels containing liquid or the amount of opaquing material in the liquid or both in combination.

It will be apparent that the degree of variation under control by the method of this invention is a substantially infinitely variable analog, from a maximum transmitted insolation effected by circulating clear liquid or admitting no liquid, to the opposite extreme of circulating completely opaque liquid through all conduits 46. While the combination of both methods provides a maximum degree of control, the use of either is advantageous.

Another advantage of the method, apparatus and system of this invention is its integration with the heating/cooling system of the building. Not only is the liquid 60 in the reservoir 59 supplying heat to the heat exchanger 80, it is also acting as a medium of insolation control through the roof of the building.

Still another advantage of this invention is that the insulation values of the panels are increased when the panels are drained of liquid and contain only air. This means if additional insulation is needed, the entire system may be drained of liquid to gain better heat retention inside the building and protection against low or high temperatures outside the building.

Still another advantage of the method and apparatus of this invention is in the use of clear liquid throughout the system whereby the insolation in the visible light spectrum is increased when desired. It has been found that circulating clear liquids in the conduits 46 of the panels 45 increases the transmission of visible light providing even better growing conditions for the plants in the greenhouse than when the conduits are empty when external insolation levels are marginal.

EXAMPLE

An example of a black liquid that was tested and found suitable for use in this invention is shown below in Table 1.

TABLE 1

| SPECIFICATIONS OF WATER-BASED BLACK LIQUID CONCENTRATE Tradename Designation: PERMABLAK 663 by Mono-Chem Corporation, Atlanta, Texas 75551 | |
|---|---|
| Percent Carbon Black by Weight | 14% |
| Total Solids | 51.9 ± 1% |
| Type Black | High Color Furnace |
| Particle Diameter of Black | 13 Nanometers |
| Type Dispersing Agent | Nonionic |
| pH | 10.0-11.5 |
| Weight per Gallon | 9.75 pounds ± 5% |

When mixed with water, the above specified black liquid provides solar absorptivity as shown in Table 2 below.

TABLE 2

| SOLAR ABSORPTIVITY OF BLACK LIQUIDS | | |
|---|---|---|
| Dilution Ratio (Parts Black Liquid/Water) | Percent of Original Black Liquid (%) | Solar Absorptivity for 1 cm Thickness (%) |
| 1:0 | 100 | 100 |
| 1:1 | 50 | 100 |
| 1:3 | 25 | 100 |
| 1:7 | 12 | 100 |
| 1:15 | 6 | 80 |
| 1:30 | 3 | 62 |

It is herein understood that although the present invention has been specifically disclosed with the preferred embodiment and examples, modifications and variations of the concept herein disclosed may be resorted to by those skilled in the art. Such modifications and variations are considered to be within the scope of the invention and the appended claims.

What is claimed is:

1. An insolation controlling apparatus in a building having varying insolation, heating and cooling needs, constructed with an exterior wall structure and a roof structure spanning between the walls, comprising:

a. a roof structure including frame assemblies of translucent insolation passing material constructed into separate panels with contiguous integrally formed common header first conduits at one end of the panels in liquid fluid communication through the panels with common header second conduits at opposite ends of the panels, the system including a plurality of valves, each connected to a first conduit and operable in selected combinations to admit the liquid to various combinations of the panels;

b. a source of liquid containing an opaquing material selected to enhance the insolation blocking opacity properties of the liquid, the source having means for varying the opacity of the liquid including a reservoir for the liquid and a filter apparatus for the liquid, the filter apparatus being arranged to remove opaquing material from the liquid or add opaquing material to the liquid prior to conveying the liquid through the first and second conduits;

c. the system for conveying the liquid from the source through the second and first conduits including a pump connected to the first conduits through the valves and connected to the reservoir through the filter apparatus with the second conduits being connected to the reservoir; and d. the valve, pump, and filter apparatus being operable selectively in combinations to control the rate of insolation transmitted into the building by varying the amount of opaquing material passing through the roof structure:
(i) by varying the amount of opaquing material in the liquid by adding or removing opaquing material in the filter apparatus, or
(ii) by varying the number and combination of panels passing liquid by pumping the liquid through the valves in selected combinations, or
(iii) by combining the variations of (i) and (ii) simultaneously;

e. the combinations being selected according to preselected optimum fulfillment of the combined heating, cooling, and insolation needs of the building, under varying atmospheric conditions having influence on the building.

2. An insolation controlling apparatus according to claim 1, wherein the panels are located between insulating still-air spaces formed between internal and external translucent roof covering members.

3. An insolation controlling apparatus according to claim 1, wherein the building is a greenhouse.

4. An insolation controlling apparatus according to claim 1, wherein heat exchange apparatus is provided in the reservoir to extract heat from the liquid therein to heat or cool the building or perform other useful work.

5. An insolation controlling apparatus in a building having varying insolation, heating and cooling needs, constructed with an exterior wall structure and a roof structure spanning between the walls, comprising:

a. a roof structure including frame assemblies of translucent insolation passing material constructed into separate panels with contiguous integrally formed common header first conduits at one end of the panel in liquid fluid communication through the panels with common header second conduits at opposite ends of the panels, the system including a plurality of valves, each connected to a first conduit and operable in selected combinations to admit the liquid to various combinations of the panels;

b. a source of liquid containing an opaquing material selected to enhance the insolation blocking opacity properties of the liquid, the source having means for varying the opacity of the liquid including a plurality of separate reservoirs, each reservoir containing a liquid having a different insolation blocking opacity for the liquid;

c. the system for conveying the liquid from the source through the second and first conduits including a pump connected to the first conduits through the valves and connected to the reservoirs with the second conduits being connected to the reservoirs; and d. the valve, pump, and plurality of reservoirs being operable selectively in combinations to control the rate of insolation transmitted into the building by varying the amount of opaquing material passing through the roof structure:

(i) by varying the amount of opaquing material in the liquid by selection of a reservoir from which to pump the liquid, or (ii) by varying the number and combination of panels passing liquid by pumping the liquid through the valves in selected combinations, or (iii) by combining the variations of (i) and (ii) simultaneously;

e. the combinations being selected according to preselected optimum fulfillment of the combined heating, cooling, and insolation needs of the building, under varying atmospheric conditions having influence on the building.

* * * * *